May 25, 1926.

C. E. HAMMOND

CRANKING DEVICE

Filed April 8, 1926

1,585,854

INVENTOR.
CLINTON E. HAMMOND

BY
ATTORNEY

Patented May 25, 1926.

1,585,854

UNITED STATES PATENT OFFICE.

CLINTON E. HAMMOND, OF BOYNE CITY, MICHIGAN.

CRANKING DEVICE.

Application filed April 8, 1926. Serial No. 100,553.

My invention relates to a new and useful improvement in a cranking device, adapted for use with internal combustion engines, and particularly adaptable for use with the well known Ford type of automobiles.

It is an object of the present invention to provide a cranking device for use with this type of automobile, whereby the crank may be removed from the crank shaft through the depending portion of the radiator frame with a suitable closure.

It is another object of the present invention to provide with a cranking device of this class a closure adapted for insertion into the opening formed in the depending portion of the radiator frame engaging on its inner surface the diametrically extending pin projected through the crank shaft extension.

Another object of the present invention is the provision of a cranking device of this class, which will be simple in structure, economical of manufacture and highly efficient in use.

Other objects will appear hereinafter.

The invention consists in the combination and arrangement of parts hereinafter described and claimed.

Figure 1:
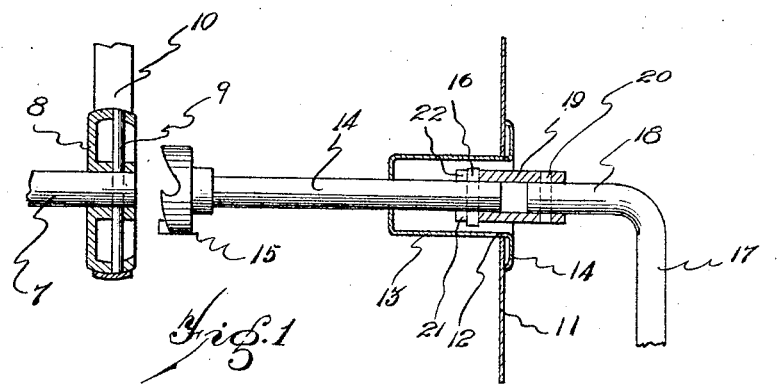
Figure 2:
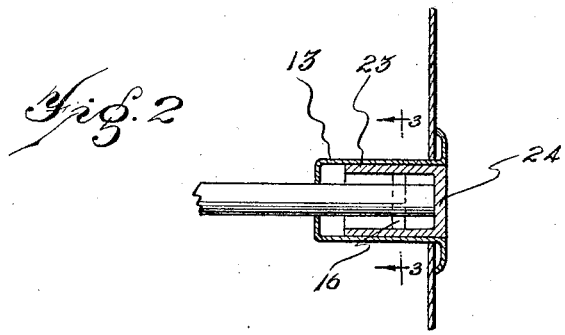
Figure 3:
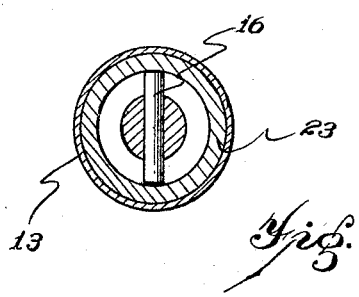

The invention will be best understood from a reference to the accompanying drawings, which form a part of this specification, and in which, Fig. 1 is a side elevational view of the invention, showing parts in section, Fig. 2 is a sectional view of the cap used in the invention, showing it in its operative position, Fig. 3 is a sectional view taken on substantially line 3—3 of Fig. 1.

As shown in the drawings, the invention is adapted for use with an internal combustion engine having a crank shaft 7 mounted, upon which the fan belt pulley 8 is keyed thereto by a suitable diametrically extending pin 9 projected through the shaft 7. The fan belt 10, which rides over the pulley 8, is also shown. With the type of automobile mentioned, as now constructed, there is projected downwardly from the radiator frame, a depending plate 11, provided with an opening 12, in which is projected rearwardly a cap 13 having its lip turned over as at 14 and projected slightly outwardly from the outer surface of the plate 11. I provide a shaft 14 to which is secured the ratchet 15 having a plurality of notches, adapted for engaging the pin 9. Projected through the shaft 14, diametrically thereof, is a pin 16. The crank 17 is provided, on its angularly turned end, 18, with a sleeve 19, pinned thereto by the pin 20 and provided, at its opposite end, at diametrically opposite points, with the longitudinally extending slots 21 and 22. In operation, the sleeve is inserted over the shaft 14, so that the projecting ends of the pin 16 engage in the slots 21 and 22, thus permitting a rotation of the shaft 15, through an operation of the crank 17. To provide a closure for the open end of the cup-shaped sleeve 13, I have arranged a cup-shaped cap 23, adapted for positioning in the cup 13 and lying with its base flush with the outer surface of the turned over portions 14. This cup shaped cap 23 is of such a diameter that it snugly engages, on its inner surface, the opposite ends of the pin 16, this fit being such that the cap 23 is rotatable thereon, because of the frictional engagement with the pin 16.

The structure is a simple and effective one, for the purposes intended, and serves to provide a cranking device whereby the crank may be easily and quickly removed from operative position and carried in any convenient position in the car, so that the appearance of the car from the front end is considerably improved. The provision of the cap 23 mounted, as described, is an effective one for preventing the dust from entering the sleeve 13, and also, for preventing a rattling of the connections. The snug engagement of the cap 23 with the pins 16 also prevents longitudinal movement of the shaft 14, when the car is being driven, so that the use of an outwardly operating coil spring, as is customarily the case, may be dispensed with.

While I have illustrated and described the preferred form of structure, I do not wish to limit myself to the precise form of structure shown, but desire to avail myself of such variations and modifications as come within the scope of the appended claims.

Having thus described my invention what I claim as new and desire to secure by Letters Patent is:

1. A cranking device of the class described, adapted for use with an internal combustion engine having a crank shaft, a pin projected through said crank shaft, a ratchet for engaging said pin, and a longitudinally movable shaft connected to said ratchet for effecting initial rotation of said crank shaft, a plate provided with an opening for receiving said longitudinally movable shaft, and a cup-shaped member positioned in said opening provided with an opening in its base for accommodating said longitudinally movable shaft and comprising: a pin projected diametrically through said longitudinally movable shaft, adjacent its outer end, said pin being positioned within said cup-shaped member; a crank; a sleeve pinned to one end of said crank and provided, at its opposite end, with a pair of diametrically oppositely longitudinally extending slots for engagement with said pin.

2. A cranking device of the class described, adapted for use with an internal combustion engine, having a depending plate provided with an opening formed therein in alinement with the crank shaft of said engine, a longitudinally movable shaft for effecting initial rotation of said crank shaft, and a cup-shaped member positioned in said opening and having its outer edges angularly turned to lie in a plane positioned forwardly of the plane of said plate and comprising: a pin projected through said longitudinally movable shaft, adjacent its outer end, said pin being positioned within said cup-shaped member, and a cup-shaped closure for said open end, said cup-shaped member being adapted for positioning over the outer end of said longitudinally movable shaft, the inner surface of said cup-shaped closure engaging snugly the opposite ends of said diametrically extended pin and the outer surface of the base of said cup-shaped closure lying in said plane.

In testimony whereof, I have signed the foregoing.

CLINTON E. HAMMOND.